US012606190B2

(12) United States Patent
Lee et al.

(10) Patent No.: US 12,606,190 B2
(45) Date of Patent: Apr. 21, 2026

(54) VEHICLE CONTROL APPARATUS AND METHOD THEREOF

(71) Applicants: Hyundai Motor Company, Seoul (KR); Kia Corporation, Seoul (KR)

(72) Inventors: Yong Joon Lee, Suwon-Si (KR); Hae Yun Kwon, Incheon (KR); Sun Woo Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 195 days.

(21) Appl. No.: 18/524,936

(22) Filed: Nov. 30, 2023

(65) Prior Publication Data

US 2025/0018965 A1 Jan. 16, 2025

(30) Foreign Application Priority Data

Jul. 11, 2023 (KR) ........................ 10-2023-0089899

(51) Int. Cl.
| | |
|---|---|
| *B60W 50/14* | (2020.01) |
| *B60R 16/023* | (2006.01) |
| *B60W 50/00* | (2006.01) |
| *G07C 5/08* | (2006.01) |

(52) U.S. Cl.
CPC ......... *B60W 50/14* (2013.01); *B60R 16/0231* (2013.01); *B60W 50/00* (2013.01); *G07C 5/085* (2013.01); *B60W 2050/0083* (2013.01); *B60W 2510/244* (2013.01)

(58) Field of Classification Search
CPC ..................................................... B60W 50/14
See application file for complete search history.

(56) References Cited

U.S. PATENT DOCUMENTS

| | | | | |
|---|---|---|---|---|
| 11,608,028 | B1 * | 3/2023 | Kent ....................... | B60R 25/01 |
| 12,097,783 | B2 * | 9/2024 | Ishibashi ................. | B60L 58/12 |
| 2024/0169769 | A1 * | 5/2024 | Kwon ..................... | B60L 58/12 |
| 2025/0018965 | A1 * | 1/2025 | Lee ...................... | B60R 16/0231 |

* cited by examiner

*Primary Examiner* — Michael A Berns
(74) *Attorney, Agent, or Firm* — Banner & Witcoff, Ltd.

(57) ABSTRACT

A vehicle control apparatus and a method thereof are provided. The vehicle control apparatus includes a first controller configured to control communication associated with a vehicle, a controller configured to control one or more hardware components of the vehicle, and memory storing power state information. The first controller is configured to send, based on the vehicle being in a first mode, a first signal for requesting first information associated with the first mode. While the vehicle is in the first mode, the one or more hardware components are operable by the second controller. The first controller is further configured to store, based on receiving the first information from the second controller, power state information, and perform a function to a state of the second controller as indicated by the power state information.

20 Claims, 7 Drawing Sheets

VEHICLE CONTROL APPARATUS
100

COMMUNICATION CONTROLLER 110

CONTROLLER 120

MEMORY 130

105

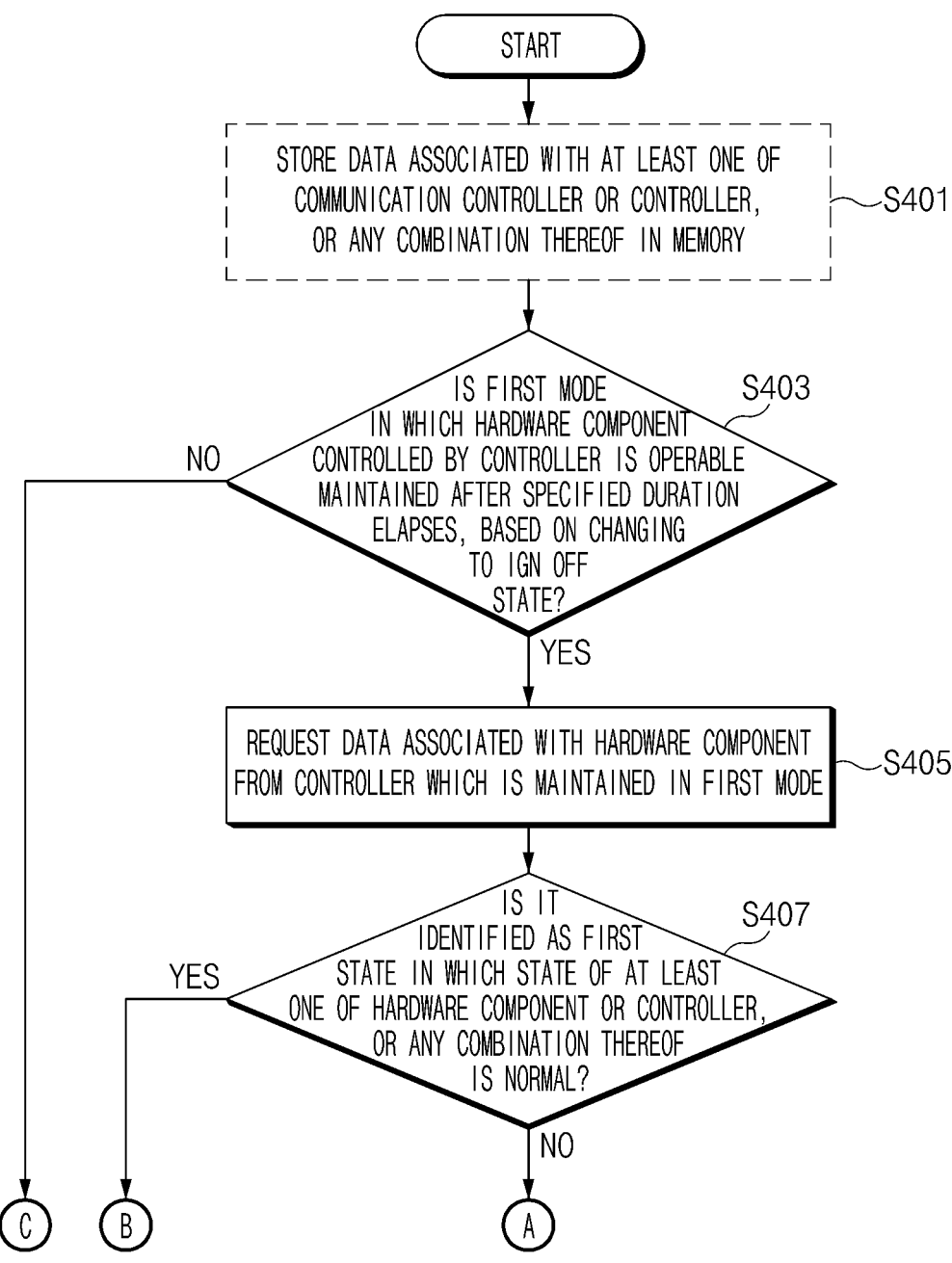

START

STORE DATA ASSOCIATED WITH AT LEAST ONE OF
COMMUNICATION CONTROLLER OR CONTROLLER,
OR ANY COMBINATION THEREOF IN MEMORY ⌐S401

IS FIRST MODE
IN WHICH HARDWARE COMPONENT
CONTROLLED BY CONTROLLER IS OPERABLE
MAINTAINED AFTER SPECIFIED DURATION
ELAPSES, BASED ON CHANGING
TO IGN OFF
STATE? S403

NO

YES

REQUEST DATA ASSOCIATED WITH HARDWARE COMPONENT
FROM CONTROLLER WHICH IS MAINTAINED IN FIRST MODE ⌐S405

IS IT
IDENTIFIED AS FIRST
STATE IN WHICH STATE OF AT LEAST
ONE OF HARDWARE COMPONENT OR CONTROLLER,
OR ANY COMBINATION THEREOF
IS NORMAL? S407

YES

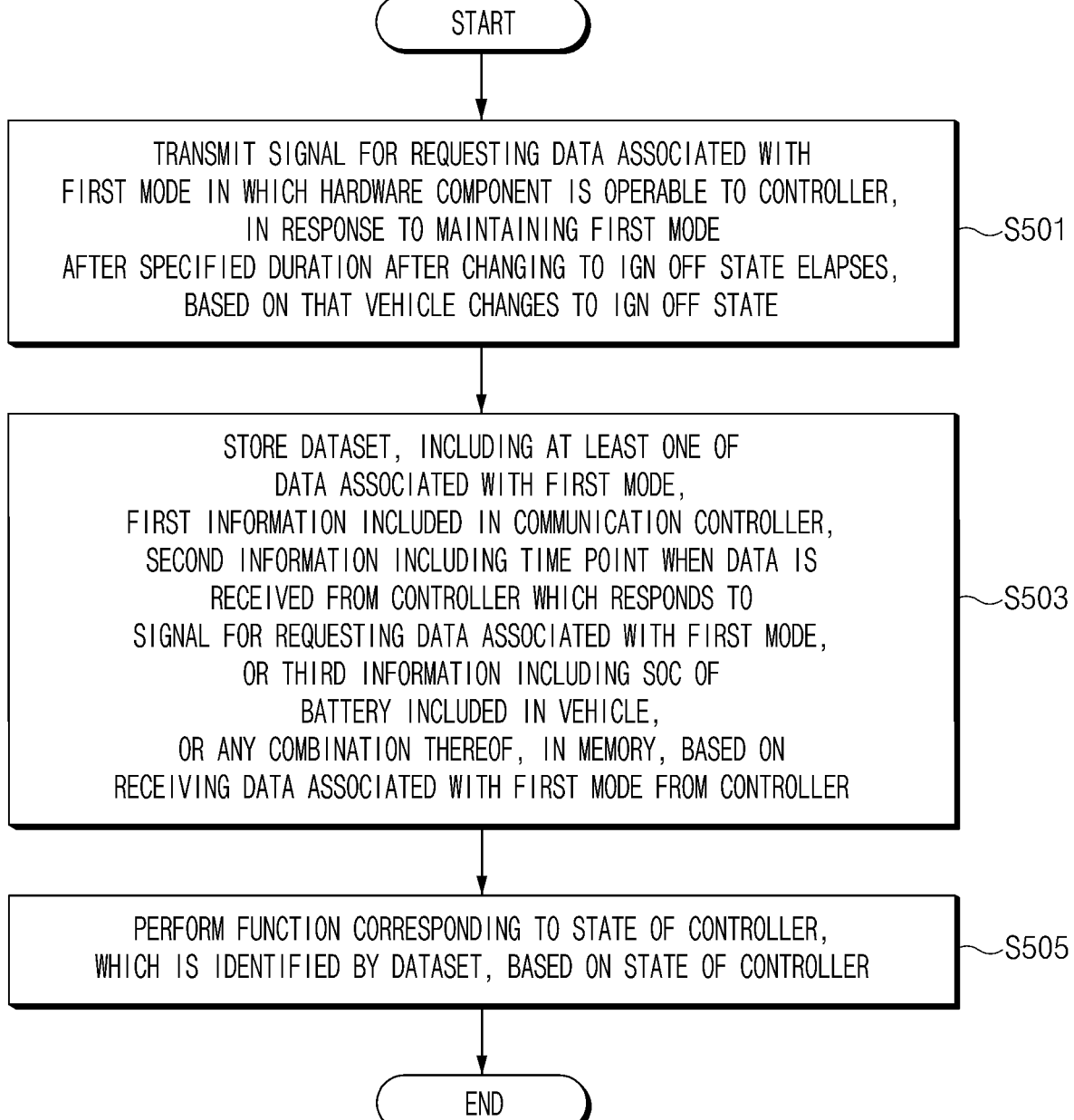

START

TRANSMIT SIGNAL FOR REQUESTING DATA ASSOCIATED WITH
FIRST MODE IN WHICH HARDWARE COMPONENT IS OPERABLE TO CONTROLLER,
IN RESPONSE TO MAINTAINING FIRST MODE
AFTER SPECIFIED DURATION AFTER CHANGING TO IGN OFF STATE ELAPSES,
BASED ON THAT VEHICLE CHANGES TO IGN OFF STATE      ~S501

STORE DATASET, INCLUDING AT LEAST ONE OF
DATA ASSOCIATED WITH FIRST MODE,
FIRST INFORMATION INCLUDED IN COMMUNICATION CONTROLLER,
SECOND INFORMATION INCLUDING TIME POINT WHEN DATA IS
RECEIVED FROM CONTROLLER WHICH RESPONDS TO
SIGNAL FOR REQUESTING DATA ASSOCIATED WITH FIRST MODE,
OR THIRD INFORMATION INCLUDING SOC OF
BATTERY INCLUDED IN VEHICLE,
OR ANY COMBINATION THEREOF, IN MEMORY, BASED ON
RECEIVING DATA ASSOCIATED WITH FIRST MODE FROM CONTROLLER      ~S503

PERFORM FUNCTION CORRESPONDING TO STATE OF CONTROLLER,
WHICH IS IDENTIFIED BY DATASET, BASED ON STATE OF CONTROLLER      ~S505

END

FIG.5

VEHICLE CONTROL APPARATUS AND METHOD THEREOF

CROSS-REFERENCE TO RELATED APPLICATION

This application claims the benefit of priority to Korean Patent Application No. 10-2023-0089899, filed in the Korean Intellectual Property Office on Jul. 11, 2023, the entire contents of which are incorporated herein by reference.

TECHNICAL FIELD

The present disclosure relates to a vehicle control apparatus and a method thereof, and more particularly, relates to technologies of controlling a hardware component.

BACKGROUND

When a vehicle changes to an ignition (IGN) off state, various hardware components included in the vehicle may transition from a non-sleep state to a sleep state.

Furthermore, when the vehicle is in the IGN off state, it may be necessary to cut off power supplied to the hardware components included in the vehicle. If the power supplied to the hardware components is not completely cut off, a battery of the vehicle may be drained (e.g., discharged) faster than anticipated.

When the battery is completely discharged, it may be impossible to operate the vehicle until the battery is charged again, for example, by visiting a service center. This, in turn, may result in extra time and cost that the user of the vehicle has to expend (e.g., a fee to use the service center).

Thus, various methods for controlling hardware components included in the vehicle, when the vehicle changes to the IGN off state, have been studied to prevent the battery from being discharged unnecessarily.

SUMMARY

The present disclosure has been made to solve the above-mentioned problems occurring in the prior art while advantages achieved by the prior art are maintained intact.

An aspect of the present disclosure provides a vehicle control apparatus for identifying a state of a hardware component or a controller and performing a different function depending on the state of the hardware component or the controller and a method thereof.

Another aspect of the present disclosure provides a vehicle control apparatus for identifying a hardware component which does not change to a sleep mode, when a vehicle is in an IGN off state, and cutting off power supplied to the identified hardware component to prevent a battery of the vehicle from being discharged and a method thereof.

Another aspect of the present disclosure provides a vehicle control apparatus for collecting information associated with a hardware component identified as being in an abnormal state, when the state of the hardware component is identified as the abnormal state, and categorizing and transmitting the collected information to an external electronic device (e.g., a server) to prevent the information associated with the hardware component which is in the abnormal state from being omitted and a method thereof.

The technical problems to be solved by the present disclosure are not limited to the aforementioned problems, and any other technical problems not mentioned herein will be clearly understood from the following description by those skilled in the art to which the present disclosure pertains.

In one or more example embodiments of the present disclosure, a vehicle control apparatus may include: a first controller configured to control communication associated with a vehicle; a second controller configured to control one or more hardware components of the vehicle; and memory storing power state information sent from at least one of the first controller or the second controller. The first controller may be configured to send, based on the vehicle being in a first mode for a predetermined time duration after the vehicle enters an ignition off state, a first signal for requesting first information associated with the first mode. While the vehicle is in the first mode, the one or more hardware components of the vehicle may be operable by the second controller. The first controller may be further configured to store, in the memory and based on receiving the first information from the second controller, power state information. The power state information may include at least one of: the first information associated with the first mode, second information associated with the first controller, third information indicating a time when the first information was received from the second controller, or fourth information indicating a state of charge (SOC) of a battery of the vehicle. The first controller may be further configured to perform, based on a state of the second controller as indicated by the power state information, a function corresponding to the state of the second controller.

The first controller may be configured to perform the function by: storing, in the memory and based on the power state information indicating that the state of the second controller is a first state associated with normal conditions of an operation of the vehicle, a data log associated with the state of the second controller.

The first controller may be configured to: determine, based on the power state information indicating that the state of the second controller is a second state different from the first state, the SOC of the battery; store the power state information by storing, in the memory and based on the SOC being greater than a threshold value, at least one of a data log associated with the state of the second controller or an identification code indicating that the second controller is in the second state; and perform the function by resetting a software component executed by the second controller.

The vehicle control apparatus may further include a power controller configured to control power supplied from the battery to the second controller. The first controller may be configured to: determine, based on the power state information indicating that the state of the second controller is a second state different from the first state, the SOC of the battery; store the power state information by storing, in the memory and based on the SOC being less than a threshold value, at least one of a data log associated with the state of the second controller, or identification code indicating that the second controller is in the second state; and perform the function by requesting the power controller to suspend the power supplied to the second controller.

The first controller may be configured to perform the function by: notifying, to a user and via a computing device, the state of the second controller.

At least one of the first information and the second information comprises at least one of: network information indicating a condition for maintaining the first mode, information associated with an operation condition of the one or more hardware components controlled by the second controller, or information associated with the second controller.

The first controller may be configured to perform the function by: categorizing, based on the state of the second controller, the power state information.

The first controller may be further configured to: determine, based on the categorized power state information, a cause for the one or more hardware components to remain in the first mode; and send, to a computing device, an indication of the cause.

The first controller may be further configured to: send, based on the function being performed, the power state information to a third controller different from the second controller; and cause a hardware component of the one or more hardware components to switch from the first mode to a second mode different from the first mode.

The first controller may include: a data acquisition device configured to obtain the power state information; and a data categorizer configured to categorize, based on the state of the second controller, the power state information.

According to one or more example embodiments of the present disclosure, a vehicle control method may include sending, by a first controller of a vehicle and based on the vehicle being in a first mode for a predetermined duration after the vehicle enters an ignition off state, a first signal for requesting first information associated with the first mode. While the vehicle is in the first mode, one or more hardware components of the vehicle may be operable by a second controller. The vehicle control method may further include storing, in memory and based on receiving the first information from the second controller, power state information. The power state information may include at least one of: the first information associated with the first mode, second information associated with the first controller, third information indicating a time when the first information was received from the second controller, or fourth information indicating a state of charge (SOC) of a battery of the vehicle. The vehicle control method may further include performing, based on a state of the second controller as indicated by the power state information, a function corresponding to the state of the second controller.

Performing the function may include: storing, in the memory and based on the power state information indicating that the state of the second controller is a first state associated with normal conditions of an operation of the vehicle, a data log associated with the state of the second controller.

The method may further include determining, based on the power state information indicating that the state of the second controller is a second state different from the first state, the SOC of the battery. Storing the power state information may include storing, in the memory and based on the SOC being greater than a threshold value, at least one of: a data log associated with the state of the second controller, or an identification code indicating that the second controller is in the second state. Performing of the function may include sending a second signal for resetting a software component executed by the second controller.

A first state may be associated with normal conditions of an operation of the vehicle. The method may further include determining, the power state information indicating that the state of the second controller is a second state different from the first state, the SOC of the battery. Storing the power state information may include storing, in the memory and based on the SOC being less than a threshold value, at least one of: a data log associated with the state of the second controller, or an identification code indicating that the second controller is in the second state. Performing the function may include sending a second signal for requesting a power controller which controls power supplied from the battery to the second controller to suspend the power supplied to the second controller.

Performing the function may include: notifying, to a user and via a computing device, the state of the second controller.

At least one of the first information or the second information may include at least one of: network information indicating a condition for maintaining the first mode, information associated with an operation condition of the one or more hardware components controlled by the second controller, or information associated with the second controller.

Performing the function may include: categorizing, based on the state of the second controller, the power state information.

The vehicle control method may further include: determining, based on the categorized power state information, a cause for the one or more hardware components to remain in the first mode; and sending, to a computing device, an indication of the cause.

The vehicle control method may further include: sending, based on the function being performed, the power state information to a third controller different from the second controller; and causing a hardware component of the one or more hardware components to switch from the first mode to a second mode different from the first mode.

The first controller may include: a data acquisition device configured to obtain the power state information; and a data categorizer configured to categorize, based on the state of the second controller, the power state information.

BRIEF DESCRIPTION OF THE DRAWINGS

The above and other objects, features and advantages of the present disclosure will be more apparent from the following detailed description taken in conjunction with the accompanying drawings:

FIGS. 4A and 4B illustrate an example of a flowchart about a vehicle control method;

FIG. 5 illustrates an example of a flowchart about a vehicle control method.

DETAILED DESCRIPTION

Figure 1:
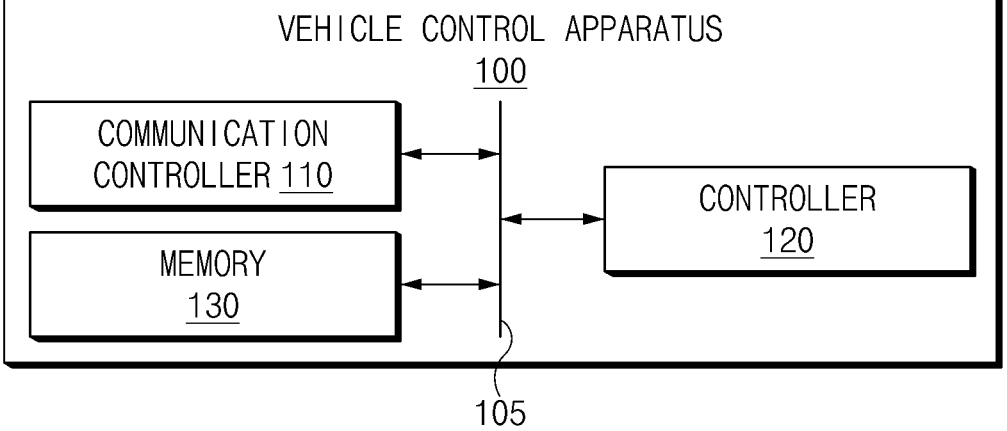
FIG. 1 illustrates an example of a block diagram of a vehicle control apparatus.

Hereinafter, one or more example embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of example embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the related field(s). It will be understood that terms used herein should be interpreted as having a meaning that is consistent with their meaning in the context of this disclosure and the relevant art and will not be interpreted in an idealized or overly formal sense unless expressly so defined herein.

When a vehicle changes from one of an ignition (IGN) on state or an ACC on state to an IGN off state, there is a need to stop operations of hardware components included in the vehicle to block the discharging of a battery included in the vehicle. However, because there is a case in which operations of the hardware components are not stopped, there is a need for a method for addressing the case.

Hereinafter, one or more example embodiments of the present disclosure will be described in detail with reference to FIGS. 1 to 6.

FIG. 1 illustrates an example of a block diagram of a vehicle control apparatus.

Referring to FIG. 1, a vehicle control apparatus 100 may be implemented inside or outside a vehicle, and some of components included in the vehicle control apparatus 100 may be implemented inside or outside the vehicle. In this case, the vehicle control apparatus 100 may be integrally configured with control units in the vehicle or may be implemented as a separate device to be connected with the control units of the vehicle by a separate connection means. For example, the vehicle control apparatus 100 may further include components which are not shown in FIG. 1.

Referring to FIG. 1, the vehicle control apparatus 100 may include at least one of a communication controller 110 (e.g., a first controller), a memory 130, or a controller 120 (e.g., a second controller), or any combination thereof. The communication controller 110, the controller 120, and the memory 130 may be electronically or operably coupled with each other by an electronical component including a communication bus 105. A description associated with respective hardware components will be given below with reference to FIG. 2.

Referring to FIG. 1, the communication controller 110 of the vehicle control apparatus 100 may identify that the vehicle including the vehicle control apparatus 100 changes to an IGN off state. For example, the communication controller 110 may identify whether to maintain a first mode in which a hardware component controlled by the controller 120 is operable (e.g., full or normal power is supplied to the hardware component), after a specified duration after changing to the IGN off state elapses, based on that the vehicle changes to the IGN off state.

The communication controller 110 may transmit a signal for requesting data associated with the first mode in which the hardware component controlled by the controller 120 is operable, in response to maintaining the first mode, after the specified duration after changing to the IGN off state elapses.

The communication controller 110 may store a dataset (e.g., power state information), including at least one of the data associated with the first mode, first information included in the communication controller 110, second information including a time point when the data associated with the first mode is received from the controller 120 which responds to the signal for requesting the data associated with the first mode, or third information including a state of charge (SOC) of a battery included in the vehicle, or any combination thereof, in the memory 130, based on receiving the data associated with the first mode from the controller 120. For example, the memory 130 may include at least one of a volatile memory or a non-volatile memory, or any combination thereof.

For example, the data associated with the first mode and the first information included in the communication controller 110 may include at least one of network information including a condition for causing maintenance of the first mode, information associated with an operation condition of the hardware component controlled by the controller 120, or information associated with the controller 120, or any combination thereof. However, the present disclosure is not limited thereto.

The communication controller 110 may identify a state of the controller 120, based on the dataset (e.g., power state information). For example, the communication controller 110 may identify a first state in which the state of the controller 120 is normal (e.g., under normal conditions of an operation of the vehicle). For example, the communication controller 110 may identify a second state in which the state of the controller 120 is abnormal (e.g., not under normal conditions of an operation of the vehicle).

The communication controller 110 may perform a function corresponding to the state of the controller 120, which is identified by the dataset, based on the state of the controller 120.

For example, the communication controller 110 may perform a first function for storing a data log associated with the state of the controller 120 in the memory 130, based on being identified as the first state in which the state of the controller 120 is normal.

For example, the communication controller 110 may identify an SOC of the battery, based on being identified as a second state different from the first state in which the state of the controller 120 is normal and may perform one of a second function or a third function.

A description associated with the first function, the second function, or the third function, which is described above, will be described below with reference to FIG. 2. Hereinafter, in FIG. 2, components included in the vehicle control apparatus 100 will be described, and operations performed by the vehicle control apparatus 100 will be described in detail.

Figure 2:
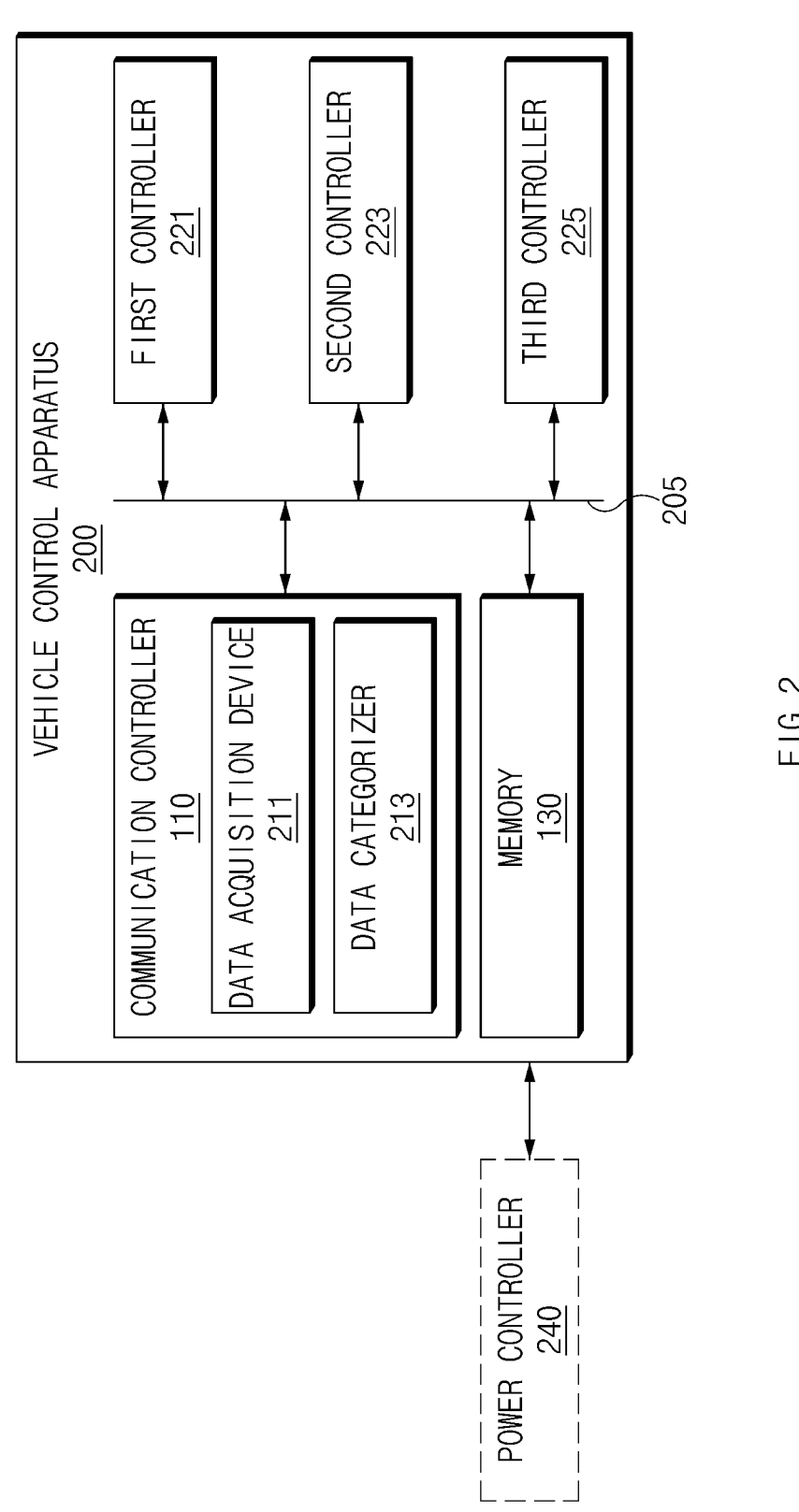
FIG. 2 illustrates another example of a block diagram of a vehicle control apparatus.

FIG. 2 illustrates another example of a block diagram of a vehicle control apparatus.

Referring to FIG. 2, a vehicle control apparatus 200 may be implemented inside or outside a vehicle, and some of components included in the vehicle control apparatus 200 may be implemented inside or outside the vehicle. In this case, the vehicle control apparatus 200 may be integrally configured with control units in the vehicle or may be implemented as a separate device to be connected with the control units of the vehicle by a separate connection means. For example, the vehicle control apparatus 200 may further include components which are not shown in FIG. 2.

Referring to FIG. 2, the vehicle control apparatus 200 may include at least one of a communication controller 110, a memory 130, a power controller 240, a first controller 221, a second controller 223, or a third controller 225, or any combination thereof. The communication controller 110, the memory 130, the power controller 240, the first controller 221, the second controller 223, and the third controller 225 may be electronically or operably coupled with each other by an electronical component including a communication bus 205.

Hereinafter, that pieces of hardware are operably coupled with each other may include that a direct connection or an indirectly connection between the pieces of hardware is established in a wired or wireless manner, such that second hardware is controlled by first hardware among the pieces of hardware. The different blocks are illustrated, but the present disclosure is not limited thereto.

For example, some of the pieces of hardware of FIG. 2 may be included in a single integrated circuit including a system on a chip (SoC). Types of the pieces of hardware included in the vehicle control apparatus 200 or the number of the pieces of hardware is limited to those shown in FIG. 2. For example, the vehicle control apparatus 200 may include some of the pieces of hardware shown in FIG. 2.

The communication controller 110 of the vehicle control apparatus 200 may include a hardware component for supporting transmission or reception of a signal between the vehicle control apparatus 200 and an external electronic device or supporting transmission or reception of a signal between hardware components in the vehicle including the vehicle control apparatus 200. For example, the communication controller 110 may be referred to as a central communication unit (CCU).

For example, the communication controller 110 may include at least one of a modem, an antenna, or an optic/electronic (O/E) converter, or any combination thereof.

For example, the communication controller 110 may support transmission or reception of a signal based on various types of protocols including at least one of an Ethernet, a local area network (LAN), a wide area network (WAN), wireless-fidelity (Wi-Fi), Bluetooth, Bluetooth low energy (BLE), ZigBee, long term evolution (LTE), 5th generation new radio (5G NR), a controller area network (CAN), a CAN with flexible data rate (CAN FD), or a local interconnect network (LIN), or any combination thereof.

The communication controller 110 may include at least one of a data acquisition device 211 or a data categorizer 213, or a combination thereof. For example, the communication controller 110 may obtain data (or information) from hardware components (e.g., the first controller 221, the second controller 223, the third controller 225, or the power controller 240) different from the communication controller 110 by means of the data acquisition device 211. However, the present disclosure is not limited thereto.

For example, the communication controller 110 may receive data (or information) from a body domain controller (BDC) or may transmit data (or information) to the BDC.

The communication controller 110 may monitor a signal transmitted or received from the communication controller 110. For example, the communication controller 110 may monitor a signal transmitted through a protocol of at least one of a CAN FD, a CAN, an Ethernet, or any combination thereof. For example, the CAN FD may include at least one of a G-CAN FD, a powertrain-CAN FD (P-CAN FD), a chassis-CAN FD (C-CAN FD), or an infotainment-CAN FD (I-CAN FD), or any combination thereof.

For example, the CAN may include at least one of a multimedia-high speed CAN (M-HS CAN), a body-HS CAN (B-HS CAN), or the power controller 240, or any combination thereof.

For example, the Ethernet may include at least one of a display device included in the vehicle, an autonomous driving control device included in the vehicle, or an autonomous parking control device, or any combination thereof.

For example, the communication controller 110 may categorize data (or information) obtained based on hardware components different from the communication controller 110, using the data categorizer 213. Alternatively, the communication controller 110 may allocate a level to the obtained data (or information), using the data categorizer 213.

The memory 130 of the vehicle control apparatus 200 may include a hardware component for storing data or an instruction input or output from a processor included in the vehicle control apparatus 200.

For example, the memory 130 may include a volatile memory including a random-access memory (RAM) or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof.

For example, the non-volatile memory may include at least one of a programmable ROM (PROM), an erasable PROM (EPROM), an electrically erasable PROM (EE-PROM), a flash memory, a hard disk, a compact disc, a solid state drive (SSD), or an embedded multi-media card (eMMC), or any combination thereof.

The power controller 240 of the vehicle control apparatus 200 may control power supplied from the battery of the vehicle including the vehicle control apparatus 200. For example, the power controller 240 may control power supplied from the battery of the vehicle to the controllers 221, 223, and 225. Alternatively, the power controller 240 may control power supplied from the battery of the vehicle to each of hardware components controlled by each of the controllers 221, 223, and 225. For example, the power controller 240 may be referred to as a power-net domain controller (PDC).

The controllers 221, 223, and 225 of the vehicle control apparatus 200 may control each of the hardware components controlled by each of the controllers 221, 223, and 225. For example, each of the controllers 221, 223, and 225 may include an electronic control unit (ECU). The first controller 221, the second controller 223, and the third controller 225 are illustrated in FIG. 1, but the present disclosure is not limited thereto. For example, the vehicle control apparatus 200 may include only the first controller 221. For another example, the vehicle control apparatus 200 may include a plurality of controllers including the first controller 221 to an nth controller.

When the vehicle changes from a state different from an IGN off state to the IGN off state, the communication controller 110 and the controllers 221, 223, and 225 may store data associated with maintaining the first mode in which the communication controller 110 and the controllers 221, 223, and 225 are operable, depending on a specified data format specification. For example, the first mode may be referred to as a non-sleep mode. The non-sleep mode may also be referred to as performance mode, active mode, operating mode, etc.

For example, the data associated with maintaining the first mode may include at least one of network information, input and output information of each of the controllers 221, 223, and 225, or internal information of each of the controllers 221, 223, and 225, or any combination thereof.

For example, the network information may include non-sleep causing data for causing the maintenance of the first mode based on at least one of a network message (NM) or a partial network cluster (PNC), or any combination thereof. For example, the network information may include a non-sleep causing condition based on receiving a diagnostic-CAN (D-CAN) signal. For example, the network information may include a non-sleep causing condition based on performing over-the-air (OTA). For example, the OTA may include a function for updating a software component included in the vehicle or the vehicle control apparatus.

For example, the input and output information of each of the controllers 221, 223, and 225 may include a trigger condition in which each of the hardware components controlled by each of the controllers 221, 223, and 225 changes from a second mode different from the first mode to the first mode. For example, the input and output information of each of the controllers 221, 223, and 225 may include output information of each of the hardware components controlled by each of the controllers 221, 223, and 225. For example, the second mode may be referred to as a sleep mode. For example, the sleep mode may include a mode in which power is not supplied (or low power is supplied compared to the first mode) to one or more hardware components and/or a controller.

For example, the internal information of each of the controllers 221, 223, and 225 may include internal error information of each of the controllers 221, 223, and 225. For example, the internal information of each of the controllers 221, 223, and 225 may include sleep delay information of an application included in each of the controllers 221, 223, and 225. For example, the internal information of each of the controllers 221, 223, and 225 may include non-sleep related information based on a characteristic of each of the controllers 221, 223, and 225.

Hereinafter, it is assumed that the first controller 221 controls a first hardware component, the second controller 223 controls a second hardware component, and the third controller 225 controls a third hardware component. However, the present disclosure is not limited thereto.

For example, the communication controller 110 included in the vehicle control apparatus 200 may identify that the first mode in which the first hardware component is operable is maintained, after the specified duration after changing to the IGN off state elapses, based on that the vehicle changes to the IGN off state. For example, the specified duration may include a time interval when about 40 minutes elapse from the time point when the vehicle changes to the IGN off state.

The communication controller 110 may transmit a signal for requesting data associated with the first mode to the first controller 221, in response to maintaining the first mode in which the first hardware component is operable, after the specified duration after changing to the vehicle IGN off state elapses. For example, the data associated with the first mode may include data associated with a controller different from the first controller 221 which causes maintenance of the first mode in which the first hardware component is operable. For example, the data associated with the first mode may include at least one of internal error data of the first controller 221, sleep delay session data of an application included in the first application 221, or non-sleep related data according to the characteristic of the first controller 221, or any combination thereof.

The communication controller 110 may store a dataset, including at least one of the data associated with the first in mode, first information included the communication controller 110, second information including a time point when the data is received from the first controller 221 which responds to the signal for requesting the data associated with the first mode, or third information including a state of charge (SOC) of a battery included in the vehicle, or any combination thereof, in the memory 130, based on receiving the data associated with the first mode from the first controller 221. For example, the communication controller 110 may store a dataset including at least one of the first information, the second information, or the third information, or any combination thereof in the non-volatile memory (e.g., the ROM) included in the memory 130.

The communication controller 110 may identify a state of the first controller 221, based on the dataset stored in the memory 130. The communication controller 110 may perform a function corresponding to the state of the first controller 221, which is identified by the dataset, based on the state of the first controller 221.

For example, the communication controller 110 may perform a first function for storing a data log associated with the state of the first controller 221 in the memory 130, based on being identified as a first state in which the state of the first controller 221 is normal by the dataset.

For example, the communication controller 110 may identify an SOC of the battery included in the vehicle, based on being identified as a second state different from the first state in which the state of the first controller 221 is normal by the dataset. The communication controller 110 may store at least one of a data log associated with the state of the first controller 221 or an identification code indicating that the first controller 221 is in the second state, or any combination thereof in the memory 130, based on that the SOC of the battery is identified as being greater than or equal to a reference value.

For example, the reference value may include about 65%. For example, the second state may include a state in which the first controller 221 is abnormal rather than being normal. For example, the identification code may be referred to as a diagnostic trouble code (DTC) and may include a different code depending on an error generated in the controller.

The communication controller 110 may perform a second function for resetting a software component included in the first controller 221, based on storing the at least one of the data log associated with the state of the first controller 221 or the identification code indicating that the first controller 221 is in the second state, or the any combination thereof in the memory 130.

For example, the communication controller 110 may identify an SOC of the battery included in the vehicle, based on being identified as the second state different from the first state in which the state of the first controller 221 is normal by the dataset. The communication controller 110 may store at least one of a data log associated with the state of the first controller 221 or identification code indicating that the first controller 221 is in the second state, or any combination thereof in the memory 130, based on that the SOC of the battery is identified as being less than the reference value.

The communication controller 110 may perform a third function for requesting the power controller 240, which controls power supplied the battery to the first controller 221, to cut off (e.g., decrease, interrupt, throttle, limit, terminate, suspend, etc.) the power supplied to the first controller 221.

The communication controller 110 may perform a fourth function for notifying a customer of the state of the first controller 221, using an external electronic device (e.g., a computing device), together with performing the third function. For example, the communication controller 110 may provide the customer with a service including a connected car service (CCS) through the external electronic device (e.g., a server).

The above-mentioned example is the case in which the single controller (e.g., the first controller) or the single hardware component (e.g., the first hardware component) maintains the first mode. Hereinafter, a description will be given of the case in which a plurality of controllers maintains the first mode.

In response to maintaining the first mode in which a plurality of hardware components (e.g., a first hardware component, a second hardware component, and a third hardware component) are operable, after a specified duration after the vehicle changes to an IGN off state elapses, the communication controller 110 included in the vehicle control apparatus 200 may transmit a signal for requesting data associated with each of the plurality of hardware components to each of the plurality of controllers 221, 223, and 225 associated with each of the plurality of hardware components. For example, the communication controller 110 may sequentially request data associated with each of the plurality of hardware components controlled by each of the plurality of controllers 221, 223, and 225 from each of the plurality of controllers 221, 223, and 225.

The communication controller 110 may sequentially receive data from each of the controllers 221, 223, and 225 which control each of the plurality of hardware components. The communication controller 110 may receive data in an order different from an order in which data associated with each of the plurality of hardware components is requested.

The communication controller 110 may store datasets, including at least one of first information included in the communication controller 110, second information including a time point when the data is received from each of the plurality of controllers 221, 223, and 225, or third information including an SOC of the battery included in the battery, or any combination thereof, in the memory 130, based on receiving the data from each of the plurality of controllers 221, 223, and 225.

The communication controller 110 may categorize the obtained datasets using the data categorizer 213. For example, the communication controller 110 may categorize the datasets as one of a first level, a second level, or a third level. The first to third levels are divided for convenience of categorization, but not limited thereto. Hereinafter, the communication controller 110 may allocate one of the first level, the second level, or the third level to the obtained datasets.

The communication controller 110 may identify a state of the first controller 221, based on the first dataset associated with the first controller 221. For example, the communication controller 110 may store a first log associated with the first controller 221 in the memory 130, based on that identifying the first state in which the state of the first controller 221 is normal.

For example, although the first hardware component controlled by the first controller 221 is maintained in the first mode, the state of the first controller 221 may be identified as the first state. For example, because the first mode is maintained by a controller different from the first controller 221, the first controller 221 may be identified as the first state which is normal.

For example, the communication controller 110 may categorize and store a first data log associated with the first controller 221 in the memory 130, based on that identifying that the first controller 221 identifies information indicating that the first state is maintained by the controller different from the first controller 221. For example, the first level may include a level indicating a normal state.

The communication controller 110 may identify a state of the second controller 223, based on a second dataset associated with the second controller 223. For example, the communication controller 110 may store a second data log associated with the second controller 223 in the memory 130, based on identifying a second state different from the first state in which the state of the second controller 223 is normal.

For example, based on that the state of the second controller 223 is identified as the second state, the communication controller 110 may identify a cause for at least one of the second controller 223 or the second hardware component, or any combination thereof to maintain the first mode and may identify whether the SOC of the battery included in the vehicle is greater than or equal to a reference value.

The communication controller 110 may store at least one of the second data log associated with the second controller 223 or the identification code, or any combination thereof in the memory 130, based on that the state of the second controller 223 is identified as the second state and that the SOC is greater than or equal to the reference value, and may request to reset a software component included in the second controller 223.

When the state of the second controller 223 is identified as the second state and when the SOC is identified as being greater than or equal to the reference value, the communication controller 110 may categorize and store the second data log associated with the second controller 223 as the second level in the memory 130. For example, the second level may include a level indicating that the state of the controller is an abnormal state and that the SOC of the battery is greater than or equal to the reference value.

The communication controller 110 may identify a state of the third controller 225, based on a third dataset associated with the third controller 225. For example, the communication controller 110 may store a third data log associated with the third controller 225 in the memory 130, based on identifying the second state different from the first state in which the state of the third controller 225 is normal.

For example, based on that the state of the third controller 225 is identified as the third state, the communication controller 110 may identify a cause for at least one of the third controller 225 or the third hardware component, or any combination thereof to maintain the first mode and may identify whether the SOC of the battery included in the vehicle is greater than or equal to the reference value.

The communication controller 110 may store at least one of the third data log associated with the third controller 225 or the identification code, or any combination thereof in the memory 130, based on that the state of the third controller 225 is identified as the second state and that the SOC is less than the reference value, and may request the power controller 240 to cut off power supplied to at least one of the third controller 225 or the third hardware component controlled by the third controller 225, or any combination thereof. Furthermore, the communication controller 110 may transmit information for providing a notification that the state of the third controller 225 is the second state to the external electronic device.

When the state of the second controller 223 is identified as the second state and when the SOC is identified as being less than the reference value, the communication controller 110 may categorize and store the third data log associated with the third controller 225 as the third level in the memory 130. For example, the third level may include a level indicating that the state of the controller is the abnormal state and that the SOC of the battery is less than the reference value.

As described above, the communication controller 110 of the vehicle control apparatus 200 may perform a different operation, based on at least one of the mode of the hardware component or the state of the controller, or any combination thereof. The communication controller 110 may perform the operation as described above, thus preventing the battery from being discharged.

Figure 3:
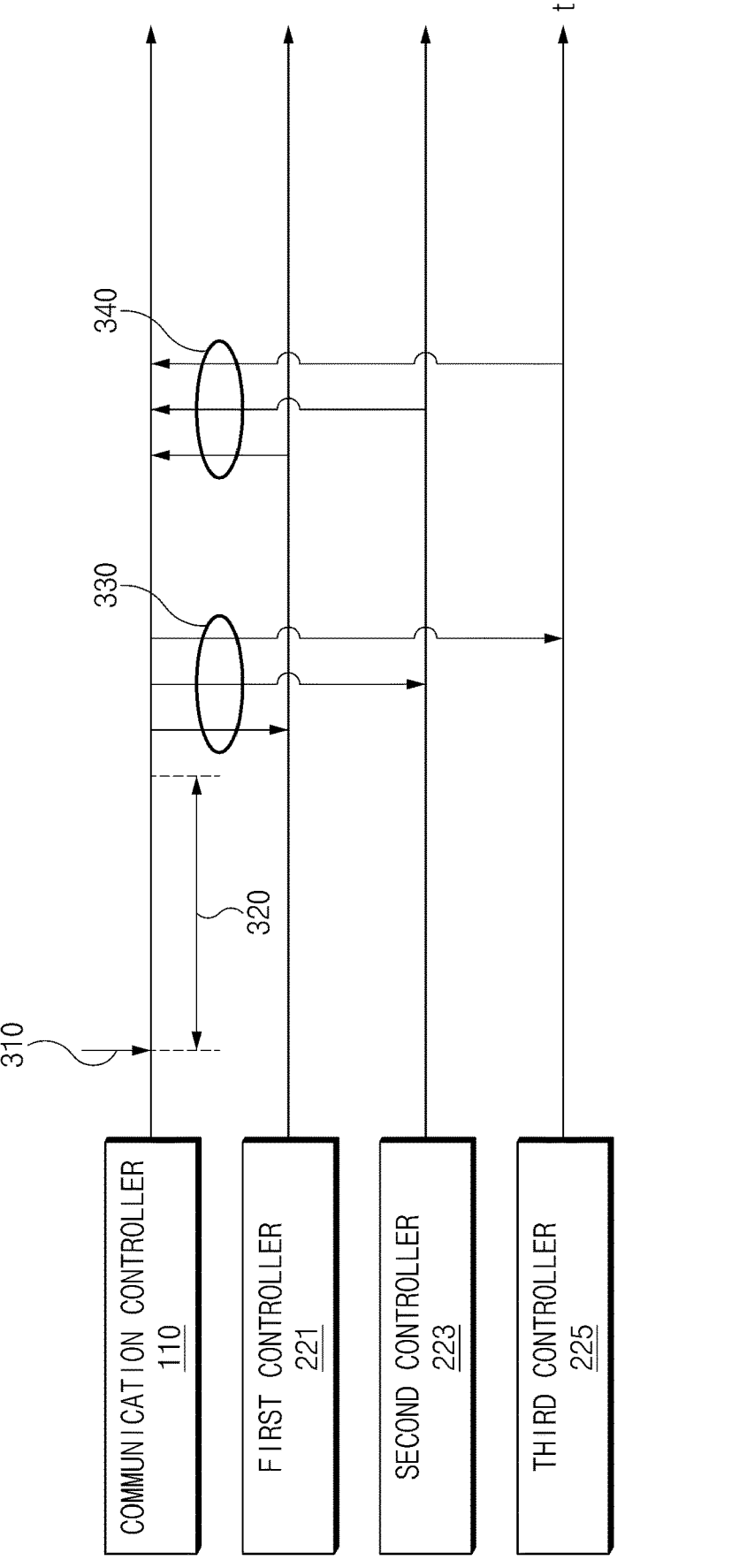
FIG. 3 illustrates an example about operations of hardware components included in a vehicle control apparatus.

FIG. 3 illustrates an example about operations of hardware components included in a vehicle control apparatus.

A communication controller 110 of FIG. 3 may include a communication controller 110 of FIG. 1. A first controller 221 of FIG. 3 may include a first controller 221 of FIG. 2. A second controller 223 of FIG. 3 may include a second controller 223 of FIG. 2. A third controller 225 of FIG. 3 may include a third controller 225 of FIG. 2.

Operations of FIG. 3 may be performed by the communication controller 110 included in a vehicle control apparatus 100 of FIG. 1 or a vehicle control apparatus 200 of FIG. 1.

Referring to FIG. 3, the communication controller 110 included in the vehicle control apparatus may identify a time point 310 when a vehicle including the vehicle control apparatus changes to an IGN off state.

The communication controller 110 may identify whether to maintain a first mode in which a hardware component is operable, after a specified duration 320 from the time point 310 when the vehicle changes to the IGN off state elapses. For example, the specified duration 320 may include about 40 minutes. However, the present disclosure is not limited thereto.

The communication controller 110 may identify whether at least one of the first controller 221, the second controller 223, or the third controller 225, or any combination thereof is operating, after the specified duration 320 from the time point 310 when the vehicle changes to the IGN off state.

The communication controller 110 may transmit a signal for requesting data associated with the first mode corresponding to at least one of the first controller 221, the second controller 223, or the third controller 225, or any combination thereof to at least one of the first controller 221, the second controller 223, or the third controller 225, or any combination thereof, based on that the at least one of the first controller 221, the second controller 223, or the third controller 225, or the any combination thereof is operating, after the specified duration 320.

The communication controller 110 may transmit signals 330 for requesting data associated with hardware components which maintains the first mode to controllers (e.g., the first controller 221, the second controller 223, and the third controller 225) which control the hardware components, in response to maintaining the first mode in which the hardware components are operable, after the specified duration 320 from the time point 310 when the vehicle changes to the IGN off state.

For example, the communication controller 110 may sequentially transmit the signals 330 for requesting the data associated with the hardware components which maintain the first mode to the controllers which control the hardware components.

The communication controller 110 may receive data 340 associated with the hardware components from the controllers 221, 223, and 225 which respond to the signals 330 for requesting the data associated with the hardware components which maintain the first mode. The communication controller 110 may categorize the obtained data 340, based on at least one of states of the controllers 221, 223, and 225 or modes of the hardware components, or any combination thereof, based on receiving the data 340 from the controllers 221, 223, and 225.

When categorizing 340, the obtained data the communication controller 110 may generate and store a dataset, including at least one of internal data of the communication controller 110, a time point when the data 340 is received, or information including the SOC of the battery, or any combination thereof, in a memory.

For example, the communication controller 110 may generate, categorize, and store a first dataset, including at least one of internal data of the communication controller 110, a time point when the data 340 is received, information including the SOC of the battery, the data 340 transmitted from the first controller 221, or any combination thereof, in the memory, based on receiving the data 340 from the first controller 221.

For example, the communication controller 110 may generate, categorize, and store a second dataset, including at least one of internal data of the communication controller 110, a time point when the data 340 is received, information including the SOC of the battery, the data 340 transmitted from the second controller 223, or any combination thereof, in the memory, based on receiving the data 340 from the second controller 223.

For example, the communication controller 110 may generate, categorize, and store a third dataset, including at least one of internal data of the communication controller 110, a time point when the data 340 is received, information including the SOC of the battery, the data 340 transmitted from the third controller 225, or any combination thereof, in the memory, based on receiving the data 340 from the third controller 225.

The communication controller 110 may perform a dataset, depending on the state of each of the controllers 221, 223, and 225, which is identified by the dataset, and may perform a function corresponding to the state of each of the controllers 221, 223, and 225.

The communication controller 110 may identify a cause for the hardware component controlled by each of the controllers 221, 223, and 225 to maintain the first mode, based on the categorized datasets. The communication controller 110 may transmit information associated with the identified cause to an external electronic device (e.g., a server) or another controller different from the controllers 221, 223, and 225. Receiving the information associated with the identified cause, the other controller may control the controllers 221, 223, and 225 to execute a function for changing to a sleep mode or perform a function for cutting off power supplied to the controllers 221, 223, and 225.

For example, the communication controller 110 may perform the first function for storing a data log associated with the state of the controller in the memory.

For example, the communication controller 110 may perform a second function for storing at least one of a data log associated with the state of the controller or identification code indicating the controller is in the second state, or any combination thereof in the memory, based on that the SOC of the battery is identified as being greater than or equal to the reference value, and resetting a software component included in the controller.

For example, the communication controller 110 may perform a third function for storing at least one of a data log associated with the of state the controller or an identification code indicating that the controller is in the second state, or any combination thereof in the memory, based on that the SOC of the battery is identified as being less than the reference value, and requesting the power controller which controls power supplied from the battery to the controller to cut off the power supplied to the controller.

As described herein, the communication controller 110 may perform different operations, depending on at least one of the state of the controller, the mode of the hardware component, or the SOC of the battery, or any combination thereof. The communication controller 110 may prevent the battery from being discharged by performing the different functions depending on the at least one of the state of the controller, the mode of the hardware component, or the SOC of the battery, or the any combination thereof, FIGS. 4A and 4B illustrate an example of a flowchart about a vehicle control method.

Hereinafter, it is assumed that a vehicle control apparatus 100 of FIG. 1 or a vehicle control apparatus 200 of FIG. 2 performs a process of FIGS. 4A and 4B.

Figure 4B:
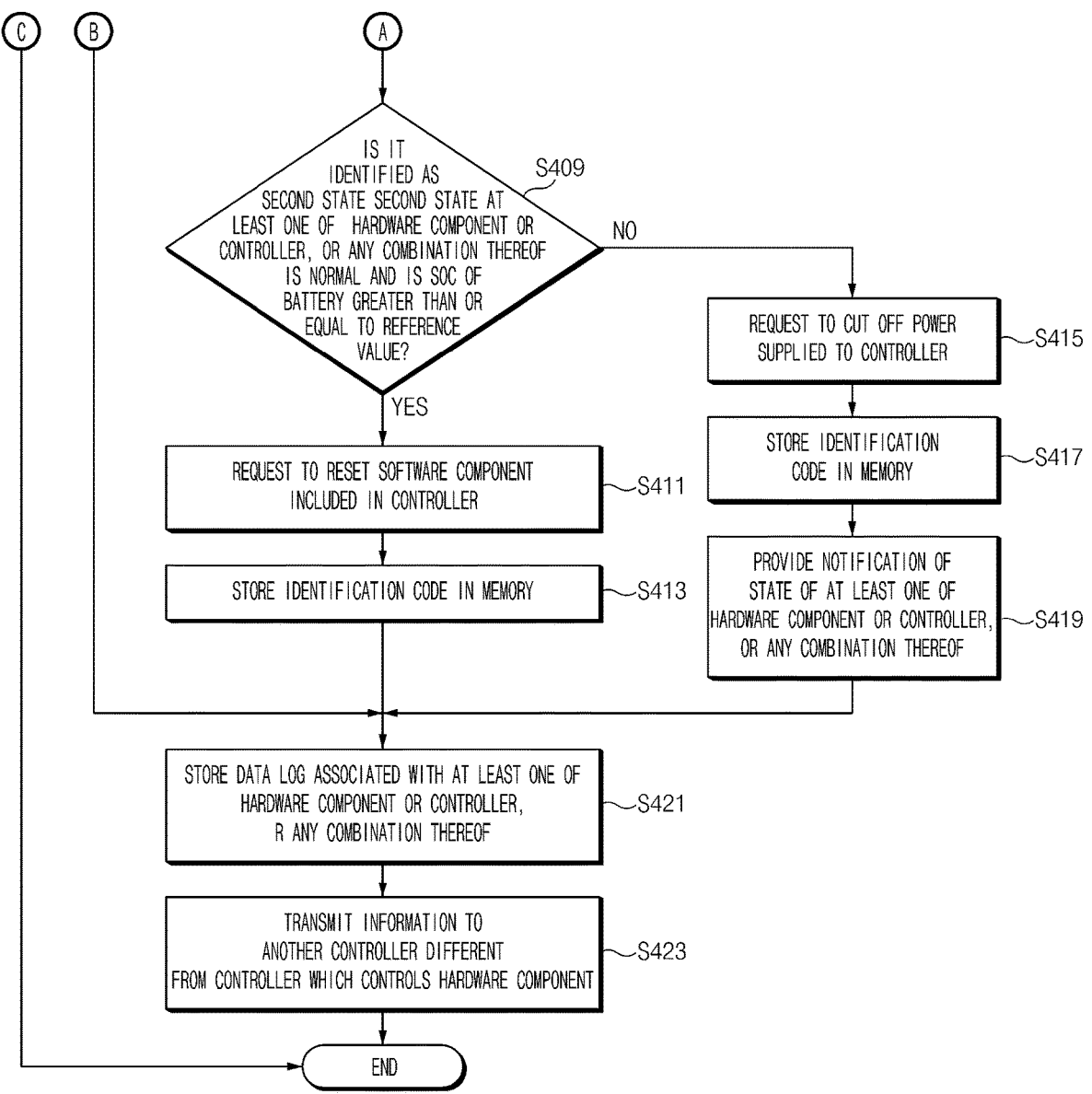

At least one of operations of FIGS. 4A and 4B may be performed by the vehicle control apparatus 100 of FIG. 1 or the vehicle control apparatus 200 of FIG. 2. Respective operations of FIGS. 4A and 4B may be sequentially performed, but are not necessarily sequentially performed. For example, an order of the respective operations may be changed, and at least two operations may be performed in parallel.

Referring to FIG. 4A, in S401, a communication controller of a vehicle control apparatus may store data associated with at least one of the communication controller or a controller which controls a hardware component, or any combination thereof in a memory.

For example, the data associated with the communication controller may include at least one of network information, input and output information of the controller, or internal information of the controller, or any combination thereof. The at least one of the network information, the input and output information of the controller, or the internal information of the controller, or the any combination thereof may include at least one of network information, input and output information of each of controllers, or internal information of each of the controllers, or any combination thereof, which is described in FIG. 1.

For example, the data associated with the controller which controls the hardware component may include at least one of network information, input and output information of the controller which controls the hardware component, or internal information of the controller which controls the hardware component, or any combination thereof.

For example, the network information of the control which controls the hardware component may include at least one of a type of the signal received from the communication controller, or a time point when the signal is received from the communication controller, or any combination thereof.

For example, the input and output information of the controller which controls the hardware component may include a trigger condition for changing from a first mode including a non-sleep mode of the hardware component to a second mode including a sleep mode. The input and output information of the controller which controls the hardware component may include information associated with an output signal transmitted to the hardware component controlled by the controller. For example, the internal information of the controller which controls the hardware component may include internal error information of the controller, sleep delay information of an application included in the controller, or non-sleep related data based on a characteristic of the controller. However, the present disclosure is not limited thereto.

In S403, the communication controller may identify that a vehicle changes to an IGN off state. The communication controller may identify whether the first mode in which the hardware component controlled by the controller is operable is maintained, after a specified duration elapses, based on that the vehicle changes to the IGN off state. For example, the specified duration may include about 40 minutes. However, the present disclosure is not limited thereto.

When the first mode in which the hardware component is operable is maintained (YES of S403), in S405, the communication controller may request data associated with the first mode from a controller which controls the hardware component which is maintained in the first mode.

When the first mode in which the hardware component is operable is not maintained (NO of S403), the communication controller may fail to perform a function and may be powered off.

For example, the communication controller may transmit at least one of a cause in which the hardware component is maintained in the first mode or a time when the hardware component is maintained in the first mode, or any combination thereof to the controller which controls the hardware component which is maintained in the first mode.

In S407, the communication controller may identify whether it is identified as a first state in which a state of at least one of the hardware component or the controller, or any combination thereof is normal.

For example, the first state may include a state in which the first mode is maintained by a controller different from the controller which controls the hardware component, although the hardware component is maintained in the first mode.

When it is not identified as the first state in which the state of the at least one of the hardware component or the controller, or the any combination thereof is normal (NO of S407), in S409, the communication controller may identify whether an SOC of a battery is greater than or equal to a reference value. For example, the reference value may include about 65%.

For example, the communication controller may identify the SOC of the battery, based on being identified as a second state different from the first state in which the state of the at least one of the hardware component or the controller which controls the hardware component, or the any combination thereof is normal.

The communication controller may identify whether the SOC of the battery is greater than or equal to the reference value, based on being identified as the second state different from the first state in which the state of the at least one of the hardware component or the controller which controls the hardware component, or the any combination thereof is normal.

For example, the communication controller may receive data including the SOC of the battery from a power controller. The communication controller may identify the SOC of the battery, based on receiving the data including the SOC of the battery from the power controller.

When the SOC of the battery is greater than or equal to the reference value (YES of S409), in S411, the communication controller may request to reset a software component included in the controller.

For example, the software component included in the controller may include an application.

In S413, the communication controller may store identification code in the memory. For example, the identification code may be referred to as a diagnostic trouble code (DTC). For example, the identification code may be set to a different value according to an error generated by the at least one of the hardware component or the controller which controls the hardware component, or the any combination thereof.

When the SOC of the battery is less than the reference value (NO of S409), in S415, the communication controller may request to cut off power supplied to the controller.

For example, the communication controller may request the power controller to cut off power supplied to the controller which controls the hardware component.

In S417, the communication controller may store the identification code in the memory. S417 may include S413 or may be substantially the same as S413.

In S419, the communication controller may provide a notification of the state of the at least one of the hardware component or the controller, or the any combination thereof. For example, the communication controller may notify a customer of at least one of a state of the hardware component or a state of the controller which controls the hardware component, or any combination thereof.

For example, the communication controller may notify the customer of a state of the at least one of the hardware component or the controller which controls the hardware component, or the any combination thereof, through a service including a CCS. For example, the communication controller may notify the customer of the state of the at least one of the hardware component or the controller which controls the hardware component, or the any combination thereof, using at least one of text or an image, or any combination thereof.

When it is identified as the first state in which the state of the at least one of the hardware component or the controller, or the any combination thereof is normal (YES of S407), in S421, the communication controller may store a data log associated with the at least one of the hardware component or the controller, or the any combination thereof.

For example, the data log may include at least one of a state of the hardware component or a time point when data included in the data log is received, or any combination thereof.

As described above, the communication controller may perform a different operation depending on the state of the hardware component or the controller to prevent the battery from being discharged and may notify the customer of the state of the hardware component or the controller to assist the customer to easily identify the state of the vehicle.

FIG. 5 illustrates an example of a flowchart about an operation of a vehicle control apparatus.

Hereinafter, it is assumed that a vehicle control apparatus 100 of FIG. 1 or a vehicle control apparatus 200 of FIG. 2 performs a process of FIG. 5.

At least one of operations of FIG. 5 may be performed by the vehicle control apparatus 100 of FIG. 1 or the vehicle control apparatus 200 of FIG. 2. Respective operations of FIG. 5 may be sequentially performed, but are not necessarily sequentially performed. For example, an order of the respective operations may be changed, and at least two operations may be performed in parallel.

In S501, a communication controller of a vehicle control apparatus may transmit a signal for requesting data associated with a first mode in which a hardware component is operable to a controller, in response to maintaining the first mode after a specified duration after changing to an IGN off state elapses, based on that a vehicle changes to the IGN off state.

For example, the first mode may include a non-sleep mode in which the hardware component is operable. For example, the first mode may include a mode in which the supply of power to the hardware component continues.

In S503, the communication controller of the vehicle control apparatus may store a dataset, including at least one of the data associated with the first mode, first information included in the communication controller, second information including a time point when the data is received from the controller which responds to the signal for requesting the data associated with the first mode, or third information including a state of charge (SOC) of a battery included in the vehicle, or any combination thereof, in a memory, based on receiving the data associated with the first mode from the controller.

For example, the data associated with the first mode may include data used to identify a cause in which the hardware component which maintains the first mode is operating.

In S505, the communication controller of the vehicle control apparatus may perform a function corresponding to a state of the controller, which is identified by the dataset, based on the state of the controller.

For example, the communication controller may identify the state of the controller based on the dataset. As example, the communication controller may identify a first state in which the state of the controller is normal, based on the dataset. As another example, the communication controller may identify a second state different from the first state in which the state of the controller is normal, based on the dataset.

For example, the communication controller may perform a different operation depending on the state of the controller. Functions performed according to the state of the controller may include at least one of a first function, a second function, a third function, or a fourth function, or any combination thereof, which is described in FIGS. 2 and 3.

Figure 6:
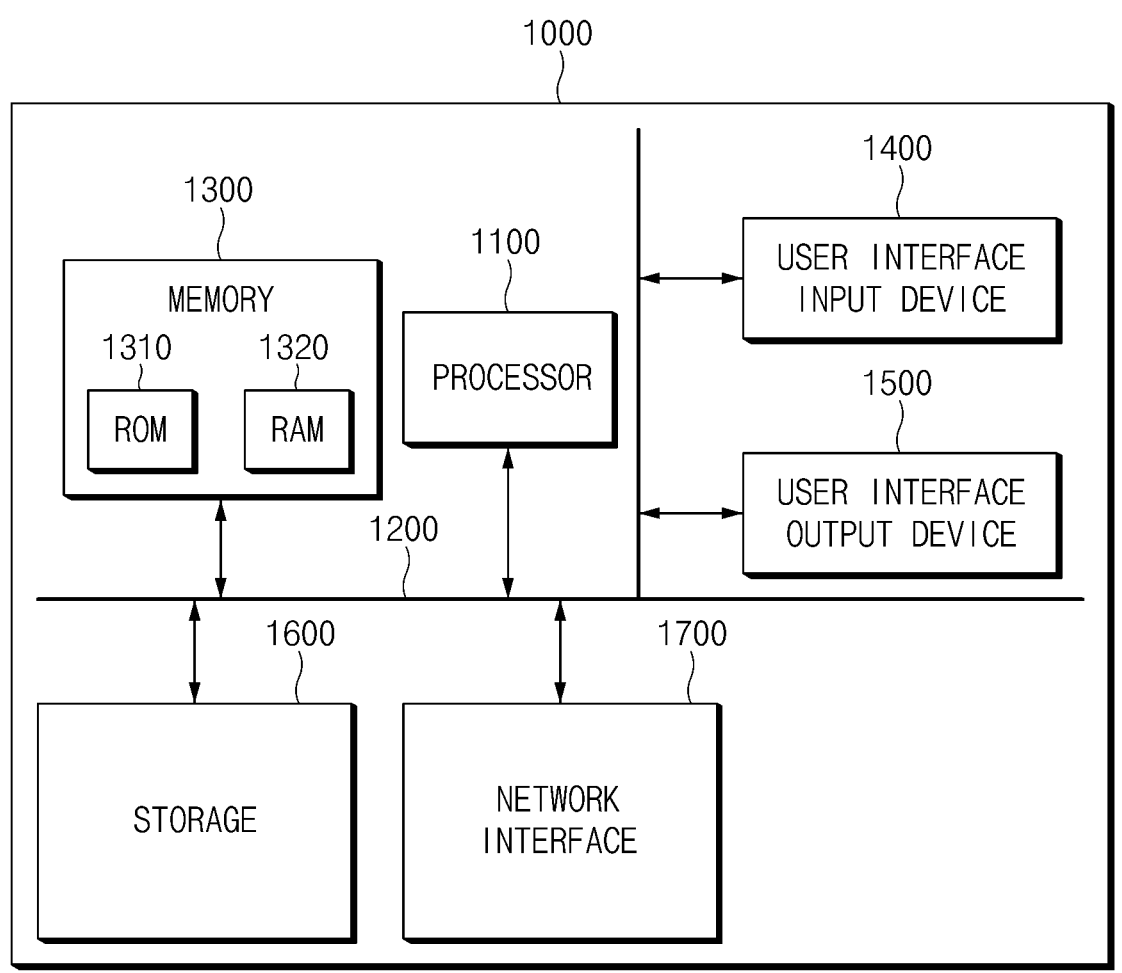
FIG. 6 illustrates a computing system associated with a vehicle control apparatus.

FIG. 6 illustrates a computing system associated with a vehicle control apparatus.

Referring to FIG. 6, a computing system 1000 may include at least one processor 1100, a memory 1300, a user interface input device 2400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described herein may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may identify a state of a hardware component or a controller and may perform a different function depending on the state of the hardware component or the controller.

Furthermore, the present technology may identify a hardware component which does not change to a sleep mode, when the vehicle is in an IGN off state, and may cut off power supplied to the identified hardware component to prevent a battery of the vehicle from being discharged.

Furthermore, the present technology may collect information associated with a hardware component identified as being in an abnormal state, when the state of the hardware component is identified as the abnormal state, and may categorize and transmit the collected information to an external electronic device (e.g., a server), thus preventing the information associated with the hardware component which is in the abnormal state from being omitted.

In addition, various effects ascertained directly or indirectly through the present disclosure may be provided.

Hereinabove, although the present disclosure has been described with reference to one or more example embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, example embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle control apparatus comprising:
   a first controller configured to control communication associated with a vehicle;
   a second controller configured to control one or more hardware components of the vehicle; and
   memory storing power state information sent from at least one of the first controller or the second controller,
   wherein the first controller is configured to:
      send, based on the vehicle being in a first mode for a predetermined time duration after the vehicle enters an ignition off state, a first signal for requesting first information associated with the first mode, wherein, while the vehicle is in the first mode, the one or more hardware components of the vehicle are operable by the second controller;
      store, in the memory and based on receiving the first information from the second controller, power state information, wherein the power state information comprises at least one of:
         the first information associated with the first mode,
         second information associated with the first controller,
         third information indicating a time when the first information was received from the second controller, or
         fourth information indicating a state of charge (SOC) of a battery of the vehicle; and
      perform, based on a state of the second controller as indicated by the power state information, a function corresponding to the state of the second controller.

2. The vehicle control apparatus of claim 1, wherein first controller is configured to perform the function by:
   storing, in the memory and based on the power state information indicating that the state of the second controller is a first state associated with normal conditions of an operation of the vehicle, a data log associated with the state of the second controller.

3. The vehicle control apparatus of claim 1, wherein a first state is associated with normal conditions of an operation of the vehicle, and wherein the first controller is configured to:
   determine, based on the power state information indicating that the state of the second controller is a second state different from the first state, the SOC of the battery;
   store the power state information by storing, in the memory and based on the SOC being greater than a threshold value, at least one of:
      a data log associated with the state of the second controller, or
      an identification code indicating that the second controller is in the second state; and
   perform the function by resetting a software component executed by the second controller.

4. The vehicle control apparatus of claim 1, wherein a first state is associated with normal conditions of an operation of the vehicle,
   wherein the vehicle control apparatus further comprises a power controller configured to control power supplied from the battery to the second controller,
   wherein the first controller is configured to:
      determine, based on the power state information indicating that the state of the second controller is a second state different from the first state, the SOC of the battery;
      store the power state information by storing, in the memory and based on the SOC being less than a threshold value, at least one of:
         a data log associated with the state of the second controller, or
         identification code indicating that the second controller is in the second state; and
      perform the function by requesting the power controller to suspend the power supplied to the second controller.

5. The vehicle control apparatus of claim 4, wherein the first controller is configured to perform the function by:
   notifying, to a user and via a computing device, the state of the second controller.

6. The vehicle control apparatus of claim 1, wherein at least one of the first information or the second information comprises at least one of: network information indicating a condition for maintaining the first mode, information associated with an operation condition of the one or more hardware components controlled by the second controller, or information associated with the second controller.

7. The vehicle control apparatus of claim 1, wherein the first controller is configured to perform the function by:
   categorizing, based on the state of the second controller, the power state information.

8. The vehicle control apparatus of claim 7, wherein the first controller is further configured to:
   determine, based on the categorized power state information, a cause for the one or more hardware components to remain in the first mode; and
   send, to a computing device, an indication of the cause.

9. The vehicle control apparatus of claim 1, wherein the first controller is further configured to:
   send, based on the function being performed, the power state information to a third controller different from the second controller; and
   cause a hardware component of the one or more hardware components to switch from the first mode to a second mode different from the first mode.

10. The vehicle control apparatus of claim 1, wherein the first controller is further configured to:

obtain the power state information; and categorize, based on the state of the second controller, the power state information.

11. A vehicle control method comprising:

sending, by a first controller of a vehicle and based on the vehicle being in a first mode for a predetermined duration after the vehicle enters an ignition off state, a first signal for requesting first information associated with the first mode, wherein, while the vehicle is in the first mode, one or more hardware components of the vehicle are operable by a second controller;

storing, in memory and based on receiving the first information from the second controller, power state information, wherein the power state information comprises at least one of:

the first information associated with the first mode, second information associated with the first controller, third information indicating a time when the first information was received from the second controller, or fourth information indicating a state of charge (SOC) of a battery of the vehicle; and performing, based on a state of the second controller as indicated by the power state information, a function corresponding to the state of the second controller.

12. The vehicle control method of claim 11, wherein the performing of the function comprises:

storing, in the memory and based on the power state information indicating that the state of the second controller is a first state associated with normal conditions of an operation of the vehicle, a data log associated with the state of the second controller.

13. The vehicle control method of claim 11, wherein a first state is associated with normal conditions of an operation of the vehicle, wherein the method further comprises determining, based on the power state information indicating that the state of the second controller is a second state different from the first state, the SOC of the battery, and wherein the storing of the power state information comprises storing, in the memory and based on the SOC being greater than a threshold value, at least one of:

a data log associated with the state of the second controller, or an identification code indicating that the second controller is in the second state, and wherein the performing of the function comprises sending a second signal for resetting a software component executed by the second controller.

14. The vehicle control method of claim 11, wherein a first state is associated with normal conditions of an operation of the vehicle, wherein the method further comprises determining, the power state information indicating that the state of the second controller is a second state different from the first state, the SOC of the battery, wherein the storing of the power state information comprises storing, in the memory and based on the SOC being less than a threshold value, at least one of:

a data log associated with the state of the second controller, or an identification code indicating that the second controller is in the second state, and wherein the performing of the function comprises sending a second signal for requesting a power controller which controls power supplied from the battery to the second controller to suspend the power supplied to the second controller.

15. The vehicle control method of claim 11, wherein at least one of the first information or the second information comprises at least one of: network information indicating a condition for maintaining the first mode, information associated with an operation condition of the one or more hardware components controlled by the second controller, or information associated with the second controller.

16. The vehicle control method of claim 11, wherein the performing of the function comprises:

categorizing, based on the state of the second controller, the power state information.

17. The vehicle control method of claim 16, further comprising:

determining, based on the categorized power state information, a cause for the one or more hardware components to remain in the first mode; and sending, to a computing device, an indication of the cause.

18. The vehicle control method of claim 11, further comprising:

sending, based on the function being performed, the power state information to a third controller different from the second controller; and causing a hardware component of the one or more hardware components to switch from the first mode to a second mode different from the first mode.

19. The vehicle control method of claim 11, further comprising:

obtaining the power state information; and categorizing, based on the state of the second controller, the power state information.

20. An apparatus of a vehicle, the apparatus comprising:

communication controller circuitry configured to control communication associated with the vehicle;

hardware component controller circuitry configured to control a hardware component of the vehicle; and memory configured to store state information associated with the hardware component, wherein the communication controller circuitry is further configured to:

during a mode in which the hardware component is operable by the hardware component controller circuitry, send, based on a predetermined time duration elapsing after the vehicle enters an ignition off state, a signal for requesting information associated with the mode;

receive, from the hardware component controller circuitry, data associated with the hardware component, wherein the data indicates a state of the hardware component controller circuitry;

store, in the memory and based on receiving the data from the hardware component controller circuitry, power state information; and perform a function corresponding to the state of the hardware component controller circuitry.

* * * * *